Aug. 27, 1935.  H. S. SMITH ET AL  2,012,733
ROASTER
Filed Sept. 10, 1932
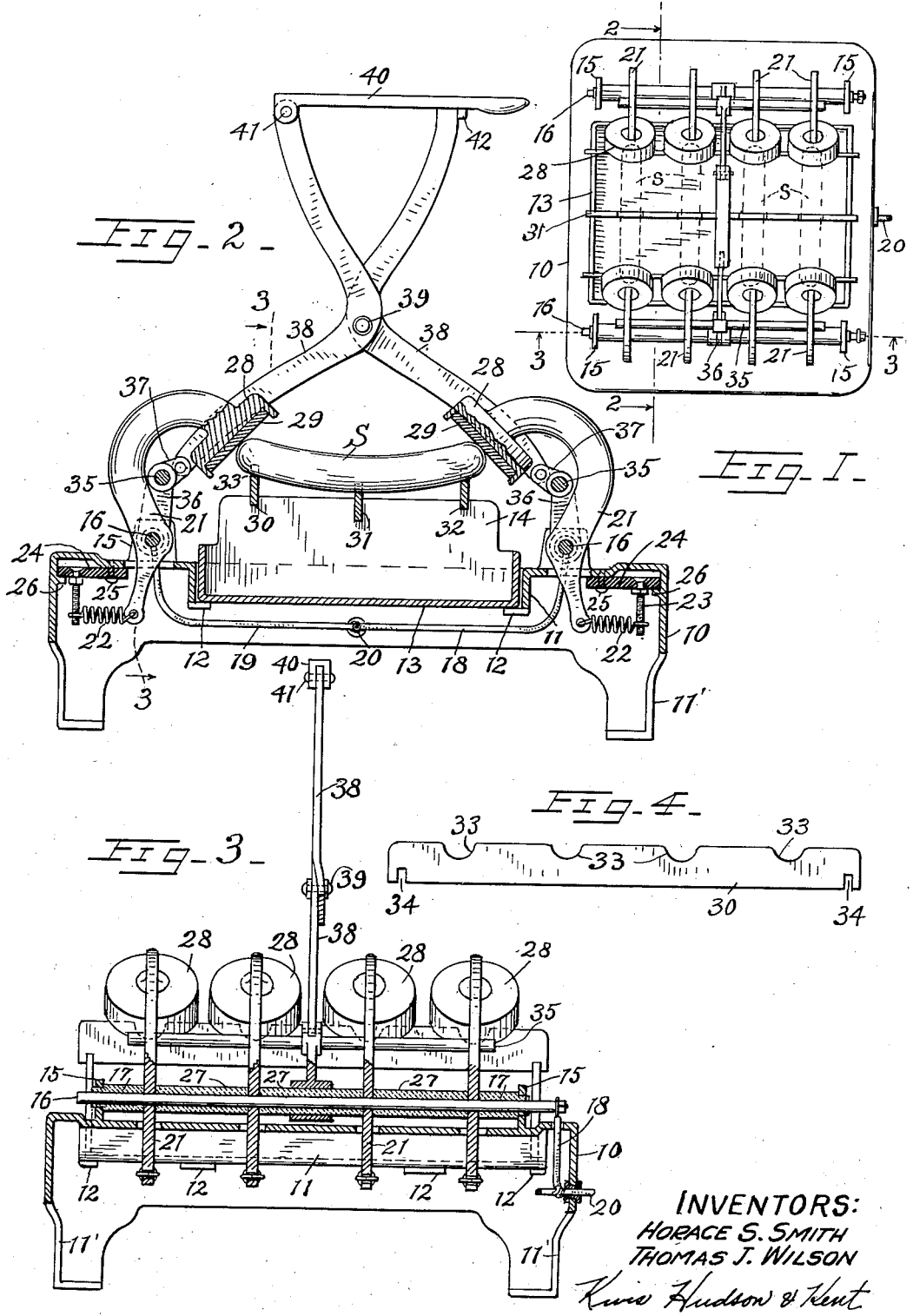
INVENTORS:
HORACE S. SMITH
THOMAS J. WILSON
Kwis Hudson & Kent
ATTORNEYS Patented Aug. 27, 1935

2,012,733

UNITED STATES PATENT OFFICE 2,012,733

ROASTER

Horace S. Smith and Thomas J. Wilson, Hubbard, Ohio

Application September 10, 1932, Serial No. 632,547

11 Claims. (Cl. 219—19)

This invention relates to roasters for cooking sausages or other elongated articles of food capable of resisting a certain amount of pressure applied lengthwise of the article.

One of the objects of the invention is the provision of a roaster of this character which shall be adapted to quick and convenient loading and unloading.

Another object is the provision of a roaster the parts of which shall be readily accessible for cleaning.

Another object is the provision of a roaster adapted to so hold one or a series of sausages that they shall not be susceptible of being dislodged during the cooking operation.

Another object is the provision of a roaster with electric terminals or contact plates so positioned and arranged as to be unlikely to accumulate grease or other foreign substances which might interfere with the transmission of electric current.

Still another object is the provision of means for supporting the sausages in an approximately horizontal position while the electric terminals are applied to their ends with the pressure requisite to effect a good electrical connection.

A further object is the provision of certain structural details having practical advantages in apparatus of this kind.

Other objects and feautres of novelty will appear as we proceed with the description of that embodiment of the invention which, for the purposes of the present application, we have illustrated in the accompanying drawing, in which Figure 1 is a plan view of a multiple roaster embodying the invention.

Fig. 2 is a vertical cross sectional view of the same on a larger scale, the section being taken substantially on the line 2—2 of Fig. 1.

Fig. 3 is a vertical longitudinal sectional view taken substantially on the lines 3—3 of Figs. 1 and 2, and Fig. 4 is an elevational detailed view of one of the sausage supporting bars.

In the drawing we have illustrated at 10 a substantially rectangular frame which may be stamped up out of sheet metal, and is provided preferably with integral legs 11 at its four corners. The frame 10 has a central rectangular opening therein surrounded by a depending flange 11. The latter may be provided at suitable intervals with inwardly bent tabs or fingers 12, which are adapted to support a metallic drip pan 13 of a shape and size to fit easily within the flanges 11 and to rest upon the tabs 12. This pan has a rim all around its periphery, including opposite end walls 14 which may be somewhat higher than the side walls thereof. The pan is made removable in the manner described in order that it may be quickly and easily taken out of the frame 10 and cleaned when necessary. When this is to be done one end of the pan is lifted sufficiently to clear the top of the frame, and the pan is then withdrawn endwise.

On either side of the frame, brackets 15 are struck up out of the metal thereof, or are separately made and welded to the frame. These brackets are employed as supports for a pair of parallel rods 16, having circular openings therethrough which receive the reduced ends of insulating sleeves 17 which surround the rods. Each of these rods is connected at one end to one of two circuit wires 18 and 19 that come together in a cable 20 which extends through an opening at one end of the frame and by which current is delivered to the heating apparatus.

Upon the rods 16 we mount at regularly spaced intervals a plurality of levers 21. These levers, while closely fitted to the rods 16 so as to afford good electrical connection therewith, are oscillatable upon the rods. They extend downwardly through slots in the frame large enough to prevent contact at all times. At their lower extremities the levers are provided with openings for the reception of coil springs 22 that are connected at their opposite ends to posts 23. The posts 23 on each side of the apparatus are mounted in a plate or strip of insulating material 24 which may be secured to the horizontal portion of the frame by rivets 25, the outer edge of the strip being supported upon lips 24 struck inwardly from the vertical outer side portions of the frame. These strips 24 serve additionally to reenforce the frame 10, and to also constitute stops for the levers 21, limiting their movement in one direction in response to the action of the springs 22. The levers 21 are maintained in the desired spaced relation by insulation sleeves 27.

The upper ends of the levers 21 have a gooseneck form, as shown in Fig. 2, with an end portion 28 that is cap-shaped and inclined downward at an angle. Within the cavity of this end portion 28 we secure a carbon disc 29 constituting an electric terminal. These terminals are adapted to engage the ends of sausages shown, or indicated, in the drawing at S.

The sausages are supported in position above the drip pan 13 by suitable means. For this purpose we prefer to employ three flat bars 30, 31 and 32, set on edge, these bars being made of some suitable hard insulating material. They are each provided in their upper edges with transverse grooves 33 spaced apart a distance equal to the spacing of levers 21, the grooves being of a size properly to receive and hold a sausage. These bars are supported upon the end walls 14 of the drip pan. For this purpose we form slots 34 in the bars 30 and 32 near the ends thereof to extend over the end walls 14 of the drip pan and support the bars thereupon at a given level. Slots similarly positioned are formed in the intermediate bar 31, but these latter slots are deeper than the slots in the bars 30 and 32 in order that the bar 31 may be positioned at a lower level, as clearly illustrated in Fig. 2. Hence, when a sausage S is placed in position in aligned grooves and the terminals 29 are caused to press inwardly and downwardly upon the ends of the sausage owing to the action of springs 22, the sausage is caused to assume a slightly bowed form, and in that manner is enabled to resist the pressure applied to its ends without danger of being dislodged. The bars 30, 31 and 32 may be readily removed for cleaning.

In order to retract the levers 21 against the action of springs 22 when sausages are to be placed in position in the roaster or to be withdrawn therefrom when the roasting is completed, we provide a means for pushing back the upper ends of the levers simultaneously. This means consists of a pair of rods 35, each mounted upon a crank 36 that is rotatable upon the central sleeve 27. The rods are thus positioned within the gooseneck portions of the levers. Each of the cranks 36 has an extension 37 thereon which has a pivotal connection with an angular lever 38. The two levers 38 are joined together by a pivot 39, and have upwardly extending portions that are adapted to be grasped in one hand of the operator. By a squeezing motion of the hand the operator can draw these upper ends together, thereby separating the lower ends and swinging the cranks 36 outwardly around the rods 16 as axes. The rods 35 carried by the cranks 36 therefore are caused to press outwardly upon the gooseneck portions of the various levers 21, which swings the upper portions of the levers outwardly to space the terminals 29 far enough apart to release sausages contained in the apparatus or to permit sausages to be placed in cooking position therein. The levers 38 may be maintained in the position illustrated in Fig. 2 by means of a latch 40 pivoted to one lever at 41 and provided with a downward projection 42 for engagement with the outer side of the other lever. By this means the levers are held normally in the positions illustrated in Fig. 2, where their upper ends may be conveniently grasped in one hand of the operator. When the levers 38 are to be operated to withdraw the terminals 29, the operator grasps their upper ends in one hand, and with his thumb pushes upwardly on the free end of latch bar 40 preparatory to exerting the squeezing pressure above referred to. Instead of employing a single set of levers 38 and rods 35 to withdraw all of the electric terminals 29 at the same time, it is possible to build this part of the apparatus in duplicate so as to operate upon half of the levers 21 at one time and half at another time. It will also be obvious that our apparatus may be built in different sizes so as to employ any desired number of cooking units.

When there are no sausages in the apparatus, it is obvious that no current will pass between the various sets of electric terminals 29. When it is desired to cook one or more sausages, the operator retracts the terminals 29 by means of the levers 38 and places one or more sausages in position in the grooves 33 of the bars 30, 31 and 32. He then releases his grip upon the levers 38, permitting the springs 22 to exert pressure endwise upon the sausages S individually. By this means substantially the same pressure may be exerted against the ends of the various sausages, regardless of the fact that they may vary considerably in length. As soon as contact is established between a sausage and a pair of terminals 29, electric current flows from one terminal through the sausage to the other terminal, and the high electrical resistance of the sausage is converted into heat which is distributed evenly throughout the sausage and serves to bring it up to cooking temperature very rapidly. When this heat has converted the moisture in the sausage to steam which, in expanding, has bursted the skin of the sausage lengthwise, the operator retracts the electric terminals 29 by operation of the levers 38, and removes the sausages.

In the foregoing description we have necessarily gone somewhat into detail in order to explain fully the particular embodiments of the invention herein illustrated, but we desire it to be understood that such detailed disclosures are not to be construed as amounting to limitations, except as they may be included in the appended claims.

Having thus described our invention, we claim:

1. In a sausage roaster, an insulating support for engaging an intermediate portion of a sausage positioned substantially horizontal, a pair of electric terminals for engaging the ends of the sausage, means for yieldably pressing said terminals inwardly toward each other, and an electric circuit including said terminals in series, said circuit being adapted to be closed through a sausage gripped between said terminals.

2. In a sausage roaster, insulating supporting means for engaging and holding a sausage with its ends higher than its middle, a pair of electric terminals for engaging the ends of the sausage, means for yieldingly pressing said terminals inwardly toward each other and downwardly, and an electric circuit including said terminals, whereby electric current may be caused to traverse the sausage from end to end.

3. In a sausage roaster, a pair of electric terminals adapted to engage the ends of a sausage, means for causing said terminals to exert a pressure inwardly towards each other against the ends of the sausage, insulating means for engagement with the sausage intermediate its ends to hold it against transverse movement in response to the longitudinal pressure exerted by said terminals.

4. In a sausage roaster, a pan, an insulating support mounted on said pan for engaging an intermediate portion of a sausage positioned substantially horizontally over the pan, a pair of electric terminals for engaging the ends of the sausage, means for yieldably pressing said terminals inwardly toward each other and downwardly, and an electric circuit including said terminals in series, whereby electric current may be caused to traverse the sausage from end to end.

5. In a sausage roaster, a frame, a pan supported therein, an insulating support removably mounted on said pan for engagement with an intermediate portion of a sausage positioned approximately horizontally over the pan, a pair of metal levers pivotally mounted in the frame upon horizontal axes and having terminals on their upper ends adapted to engage the ends of the sausage, springs acting upon said levers for causing said terminals to press inwardly upon the sausage, and an electric circuit including said terminals in series, whereby electric current may be caused to traverse the sausage from end to end.

6. In a sausage roaster, a frame, a pan supported therein, an insulating support removably mounted on said pan for engagement with an intermediate portion of a sausage positioned approximately horizontally over the pan, a pair of metal levers pivotally mounted in the frame upon horizontal axes and having terminals on their upper ends adapted to engage the ends of the sausage, springs acting upon said levers for causing said terminals to press inwardly upon the sausage, an electric circuit including said terminals in series, whereby electric current may be caused to traverse the sausage from end to end, and means adapted to be grasped by the operator for spreading apart the upper ends of said levers in order that the sausage may be removed.

7. In a sausage roaster, a pan having two upstanding opposite walls, and means for supporting a plurality of sausages above the pan, comprising three bars of insulating material having transverse aligned grooves in their upper surfaces for the reception of the sausage, said bars near the ends thereof having slots in their under surfaces for the reception of the said walls of the pan, the slots in the middle bar being deeper than those in the outer bars, and pairs of electric terminals adapted to press inwardly and downwardly against the ends of the sausages when supported in said grooves.

8. In a sausage roaster, a frame, two pivot rods mounted on the frame in parallel arrangement, a plurality of levers rotatably mounted upon each of said pivot rods, an electric terminal at one end of each of said levers for engagement with sausages to be roasted, an electric circuit, each of said rods being electrically connected to one side of said circuit, springs for urging inwardly the terminal ends of the levers individually, and means adapted to be grasped by the operator for spreading the terminal ends of the levers against the action of said springs.

9. In a sausage roaster, a pan having upstanding opposite walls, means for supporting a sausage above the pan comprising three bars of insulating material having transverse aligned grooves in their upper surfaces for the reception of the sausage, said bars being supported upon said opposite walls of the pan, the grooves in the outer bars being at a higher elevation than the groove in the middle bar, and a pair of electric terminals adapted to press inwardly and downwardly against the ends of the sausage when supported in said grooves.

10. In a sausage roaster, a frame, two pivot rods mounted on the frame in parallel arrangement, a plurality of levers mounted upon each of said rods, an electric terminal at one end of each of said levers for engagement with a sausage to be roasted, an electric circuit, each of said rods being electrically connected to one side of said circuit, and means for urging inwardly toward each other the terminal ends of the levers.

11. An electric cooking device of the class described comprising a base open at its top, a food-receiving tray receptive in said opening, a pair of rock shafts mounted in the base, resiliently mounted contact terminals on the rock shafts, and manually operable means arranged to rock said contact terminals selectively into or out of engagement with an article of food on said tray.

HORACE S. SMITH.
THOMAS J. WILSON.